(12) United States Patent
Birk et al.

(10) Patent No.: US 10,686,544 B2
(45) Date of Patent: Jun. 16, 2020

(54) MACHINE LEARNING TECHNIQUES FOR SELECTING PATHS IN MULTI-VENDOR RECONFIGURABLE OPTICAL ADD/DROP MULTIPLEXER NETWORKS

(71) Applicant: AT&T Intellectual Property I, L.P., Atlanta, GA (US)

(72) Inventors: Martin Birk, Holmdel, NJ (US); David Frederick Lynch, Freehold, NJ (US); Gaurav Thakur, Matawan, NJ (US); Simon Tse, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/135,844

(22) Filed: Sep. 19, 2018

(65) Prior Publication Data

US 2020/0092026 A1    Mar. 19, 2020

(51) Int. Cl.
| | | |
|---|---|---|
| *H04J 14/00* | (2006.01) | |
| *H04J 14/02* | (2006.01) | |
| *H04L 12/751* | (2013.01) | |
| *H04B 10/079* | (2013.01) | |
| *H04B 10/00* | (2013.01) | |

(52) U.S. Cl.
CPC ...... *H04J 14/0212* (2013.01); *H04B 10/0795* (2013.01); *H04L 45/08* (2013.01)

(58) Field of Classification Search
CPC ............... H04J 14/0267; H04J 14/0268; H04J 14/0271; H04J 14/0257
See application file for complete search history.

(56) References Cited

U.S. PATENT DOCUMENTS

| | | |
|---|---|---|
| 6,731,834 B2 | 5/2004 | Deangelis et al. |
| 7,242,868 B2 | 7/2007 | Soto et al. |
| (Continued) | | |

FOREIGN PATENT DOCUMENTS

| | | |
|---|---|---|
| EP | 2995021 B1 | 7/2017 |
| JP | 6289176 B2 | 3/2018 |
| (Continued) | | |

OTHER PUBLICATIONS

"Neural Network Based Wavelength Assignment in Optical Switching", Gutterman et al., par.nsf.gov, Aug. 21, 2017 https://arxiv.org.pdf/1801.01704.pdf (Year: 2017).*
"Two Use Cases of Machine Learning for SDN-Enabled IP/Optical Networks: Traffic Matrix Prediction and Optical Path Performance Prediction" arxiv.org (May 18, 2018) https://arxiv.org/pdf/1804.07433.pdf.

(Continued)

*Primary Examiner* — Daniel G Dobson

(57) ABSTRACT

Devices, computer-readable media and methods are disclosed for selecting paths in reconfigurable optical add/drop multiplexer (ROADM) networks using machine learning. In one example, a method includes defining a feature set for a proposed path through a wavelength division multiplexing network, wherein the proposed path traverses at least one link in the network, and wherein the at least one link connects a pair of reconfigurable optical add/drop multiplexers, predicting an optical performance of the proposed path, wherein the predicting employs a machine learning model that takes the feature set as an input and outputs a metric that quantifies predicted optical performance, and determining whether to deploy a new wavelength on the proposed path based on the predicted optical performance of the proposed path.

20 Claims, 5 Drawing Sheets

(56) References Cited

U.S. PATENT DOCUMENTS

| | | |
|---|---|---|
| 7,251,297 B2 | 7/2007 | Agazzi |
| 7,327,958 B2 | 2/2008 | Kilper et al. |
| 7,769,302 B1 | 8/2010 | Birk et al. |
| 9,094,148 B2 | 7/2015 | Ji et al. |
| 9,337,948 B2 | 5/2016 | Soto et al. |
| 9,503,188 B2 | 11/2016 | Jiang et al. |
| 9,608,722 B2 | 3/2017 | Liu et al. |
| 9,716,603 B2 | 7/2017 | Vidal |
| 9,929,800 B2 | 3/2018 | Anand et al. |
| 9,967,047 B2 | 5/2018 | Le et al. |
| 9,995,879 B2 | 6/2018 | Winzer et al. |
| 2002/0171896 A1 | 11/2002 | Clark et al. |
| 2004/0208602 A1 | 10/2004 | Plante |
| 2005/0175339 A1 | 8/2005 | Herskowits et al. |
| 2017/0048018 A1 | 2/2017 | Swinkels et al. |
| 2017/0102603 A1 | 4/2017 | Holmes |
| 2018/0367445 A1* | 12/2018 | Bajaj .................... H04L 41/142 |

FOREIGN PATENT DOCUMENTS

| | | |
|---|---|---|
| WO | 2005013519 A1 | 2/2005 |
| WO | 2018005754 A1 | 1/2018 |

OTHER PUBLICATIONS

"Deep Neural Network Based Wavelength Selection and Switching in ROADM Systems" wimnet.ee.columbia.edu (2018) http://wimnet.ee.columbia.edu/wp-content/uploads/2018/04/DNN_WavelengthSelectionJOCN.pdf.

"Neural Network Based Wavelength Assignment in Optical Switching" par.nsf.gov (Aug. 21, 2017) https://par.nsf.gov/servlets/purl/10048088.

"Artificial Intelligence (AI) Methods in Optical Networks: A Comprehensive Survey" arxiv.org (Jan. 16, 2018) https://arxiv.org/pdf/1801.01704.pdf.

* cited by examiner

MACHINE LEARNING TECHNIQUES FOR SELECTING PATHS IN MULTI-VENDOR RECONFIGURABLE OPTICAL ADD/DROP MULTIPLEXER NETWORKS

The present disclosure relates generally to telecommunication network operations, e.g., in a wavelength division multiplexing (WDM) network, and more particularly to devices, computer-readable media, and methods for selecting paths in multi-vendor reconfigurable optical add/drop multiplexer networks using machine learning.

BACKGROUND

Reconfigurable optical add/drop multiplexers (ROADMs) are increasingly being used in dense-wavelength-division-multiplexed (DWDM) networks to support Layer 1 services, such as private lines. Software-controlled ROADMs manage data traveling over high-capacity fiber optic lines and can automatically detect and adjust bandwidth, move traffic to different lanes, turn off wavelengths for a variety of different reasons, and so forth.

Generally, each ROADM is connected to one or more other ROADMs by one or more optical fiber pairs. A given ROADM will transmit an optical signal on one fiber in a pair and receive a return signal on the other fiber in the pair; thus, each optical fiber transmits in a single direction. A Layer 1 service, or a wavelength, can then be set up between two transponders, where each transponder is connected to a nearby ROADM. The wavelength may then be routed through the ROADM network.

SUMMARY

Devices, computer-readable media and methods are disclosed for selecting paths in reconfigurable optical add/drop multiplexer (ROADM) networks using machine learning. In one example, a method includes defining a feature set for a proposed path through a wavelength division multiplexing network, wherein the proposed path traverses at least one link in the network, and wherein the at least one link connects a pair of reconfigurable optical add/drop multiplexers, predicting an optical performance of the proposed path, wherein the predicting employs a machine learning model that takes the feature set as an input and outputs a metric that quantifies predicted optical performance, and determining whether to deploy a new wavelength on the proposed path based on the predicted optical performance of the proposed path.

In another example, a non-transitory computer-readable medium stores instructions which, when executed by a processing system including at least one processor, cause the processing system to perform operations. The operations include defining a feature set for a proposed path through a wavelength division multiplexing network, wherein the proposed path traverses at least one link in the network, and wherein the at least one link connects a pair of reconfigurable optical add/drop multiplexers, predicting an optical performance of the proposed path, wherein the predicting employs a machine learning model that takes the feature set as an input and outputs a metric that quantifies predicted optical performance; and determining whether to deploy a new wavelength on the proposed path based on the predicted optical performance of the proposed path.

In another example, a system includes a processor and a non-transitory computer-readable medium storing instructions which, when executed by the processor, cause the processor to perform operations. The operations include defining a feature set for a proposed path through a wavelength division multiplexing network, wherein the proposed path traverses at least one link in the network, and wherein the at least one link connects a pair of reconfigurable optical add/drop multiplexers, predicting an optical performance of the proposed path, wherein the predicting employs a machine learning model that takes the feature set as an input and outputs a metric that quantifies predicted optical performance; and determining whether to deploy a new wavelength on the proposed path based on the predicted optical performance of the proposed path.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
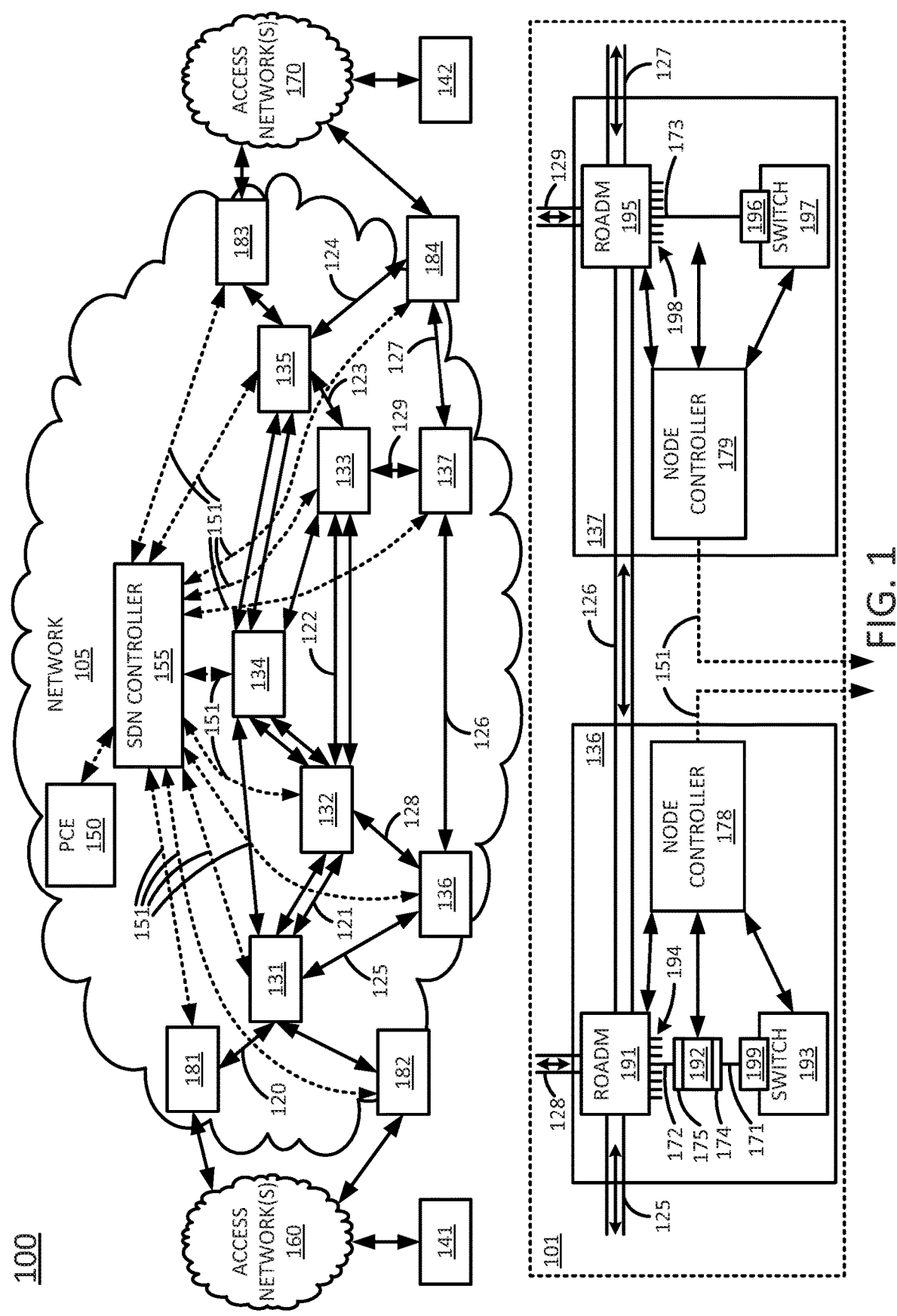
FIG. 1 illustrates an example system related to the present disclosure.

The present disclosure broadly discloses devices, computer-readable media and methods for selecting paths in reconfigurable optical add/drop multiplexer (ROADM) networks using machine learning. As discussed above, software-controlled ROADMs manage data traveling over high-capacity fiber optic lines and can automatically detect and adjust bandwidth, move traffic to different lanes, turn off wavelengths for a variety of different reasons, and so forth. Generally, each ROADM is connected to one or more other ROADMs by one or more optical fiber pairs. A given ROADM will transmit an optical signal on one fiber in a pair and receive a return signal on the other fiber in the pair; thus, each optical fiber transmits in a single direction. A Layer 1 service, or a wavelength, can then be set up between two transponders, where each transponder is connected to a nearby ROADM. The wavelength may then be routed through the ROADM network.

Various factors can affect the quality of an optical signal being transmitted over a wavelength in a ROADM network. For instance, imperfections in the optical fibers can add noise, and signal distortions may be introduced as the optical signal passes through equipment (e.g., ROADMs and amplifiers) and over distance. Thus, before provisioning a new wavelength, the new wavelength may first be evaluated by the service provider to verify that the new wavelength satisfies the service provider's optical performance standards (e.g., meets a target or threshold bit error rate (BER)). In some cases, the best optical path may not necessarily be the shortest one (due, e.g., to various network conditions, imperfections in the optical fibers, etc.). Conventionally, evaluation of proposed wavelengths is based on detailed knowledge of vendor equipment and is performed using vendor-specific tools that use proprietary software. Thus, although this conventional approach may be effective for single-vendor networks (i.e., networks in which a single vendor provides all of the equipment), it is infeasible for multi-vendor networks (i.e., networks in which multiple vendors may provide the equipment).

In one example, the present disclosure relates to a ROADM-based network according to an open standard, such as the Open ROADM Multi-Source Agreement. Unlike ROADMs that are vendor specific and highly proprietary, and which may require custom and static configuration and provisioning, open standard ROADMs and optical plug-ins allow multi-vendor interoperability where various equipment support standardized application programming interfaces (APIs). Examples of the present disclosure use machine learning techniques to predict the optical performance (e.g., as quantified, for example, by the bit error rate) of new wavelengths in Open ROADM-based networks. In one example, the prediction is based on the characteristics and optical performance of existing wavelengths in the network, and requires little or no knowledge of the internal configuration of the network equipment. These and other aspects of the present disclosure are discussed in greater detail below in connection with the examples of FIGS. 1-5. Although examples of the present disclosure are discussed within the context of multi-vendor networks such as Open ROADM-based networks, these examples may apply to single-vendor networks as well.

To aid in understanding the present disclosure, FIG. 1 illustrates an example system 100 comprising a plurality of different networks in which examples of the present disclosure for selecting paths in ROADM networks may operate. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may utilize IP routing (e.g., without MPLS). Furthermore, network 105 may comprise multiple networks utilizing different protocols, all utilizing a shared underlying WDM infrastructure (fibers, amplifiers, ROADMs, etc.), e.g., an optical transport network. In this regard, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may comprise wireless networks (e.g., Institute of Electrical and Electronics Engineers (IEEE) 802.11/Wi-Fi networks and the like), cellular access networks (e.g., Universal Terrestrial Radio Access Networks (UTRANs) or evolved UTRANs (eUTRANs), and the like), circuit switched networks (e.g., public switched telephone networks (PSTNs)), cable networks, digital subscriber line (DSL) networks, metropolitan area networks (MANs), Internet service provider (ISP) networks, peer networks, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141 and 142. For instance, the traffic may relate to communications such as voice telephone calls, video and other multimedia, text messaging, emails, and so forth between the user devices 141 and 142, or between the user devices 141 and/or 142 and other devices that may be accessible via networks 160 and 170. User devices 141 and 142 may comprise, for example, cellular telephones, smart phones, personal computers, other wireless and wired computing devices, private branch exchanges, customer edge (CE) routers, media terminal adapters, cable boxes, home gateways and/or routers, and so forth.

As stated above, network 105 comprises a WDM network (e.g., a dense wavelength division multiplexing (DWDM) network). Accordingly, in one example, the nodes 131-137 may include optical components, such as ROADMs, and the links between nodes 131-137 may comprise fiber optic cables. For ease of illustration, a portion of the links is specifically labeled as links 120-129. Inset 101 illustrates a portion of the network 105 comprising nodes 136 and 137, and links 125-129. As shown in inset 101, node 136 includes a ROADM 191 coupled to links 125, 126, and 128, a plurality of add/drop ports 194, and a network switch 193 coupled to the ROADM 191 via one of the plurality of add/drop ports 194 and a transponder 192. It should be noted that the network switch 193 may include a transceiver 199 which is coupled to the transponder 192 via a fiber optic patch cord 171. The transponder 192 may include a client side transceiver 174 (which in one example may comprise the same or similar quality optics as the transceiver 199, e.g., an SFP transceiver, a 10 Gb small form factor pluggable (XFP) transceiver, or the like) and a ROADM side/line side transceiver 175 (which may comprise higher quality optics for transmitting and receiving signals over longer distances between nodes of the network 105, e.g., hundreds of kilometers up to 2,000 or more kilometers) coupled to one of the add/drop ports 194 via a fiber optic patch cord 172. In one example, the transceiver 192 may comprise a muxponder that may aggregate several lower bandwidth signals from network switch 193 and/or from one or more other network switches, routers, or other client devices at node 136 into a combined signal for transmission over one of the network links 125, 126, or 128.

Similarly, node 137 includes a ROADM 195 coupled to links 126, 127, and 129, a plurality of add/drop ports 198, and a network switch 197 coupled to ROADM 195 via a patch cord 173 between one of the plurality of add/drop ports 198 and a transponder 196. It should be noted that as illustrated in FIG. 1, the transponder 196 may be integrated within network switch 197, e.g., within a pluggable slot (such as a CFP or CFP2 slot, a QSFP28 slot, or the like). In one example, transponder 196 may be capable of transmitting and/or receiving optical signals for use in metro or transport applications at data rates of 100 Gb/s or greater. However, in another example, transponder 196 may transmit and receive at lower data rates, such as 25 Gb/s, 10 Gb/s etc. ROADMs 191 and 195 may comprise colorless ROADMs, directionless ROADMs, colorless and directionless ROADMs (CD ROADMs), contentionless ROADMs, e.g., colorless, directionless, and contentionless (CDC) ROADMs, and so forth. Additionally, it should be noted that these ROADMs may include Open ROADMs with open standards allowing interoperability of different ROADMs manufactured by different vendors.

It should be noted that in each of nodes 136 and 137, any number of routers, switches, application servers, and the like may be connected to one of the plurality of add/drop ports 194 or plurality of add/drop ports 198, e.g., via additional transponders and/or transceivers. In addition, in other examples, additional components, such as additional ROADMs, may be connected to one of the plurality of add/drop ports 194 or plurality of add/drop ports 198. For instance, in another example, node 137 may include a number of ROADMs, wavelength selective switches (WSSs), and other components that are interconnected to provide a higher degree node. In addition, as referred to herein the terms "switch" and "network switch" may refer to any of a number of similar devices, e.g., including: a layer 2 switch (e.g., an Ethernet switch), a layer 3 switch/multilayer switch, a router (e.g., a router which may also include switching functions), or the like. It should also be noted that nodes 131-135 may have a same or similar setup as nodes 136 and 137. In addition, in one example, any one or more of components 181-184 may also comprise an optical node with a same or similar setup as nodes 136 and 137.

Figure 5:
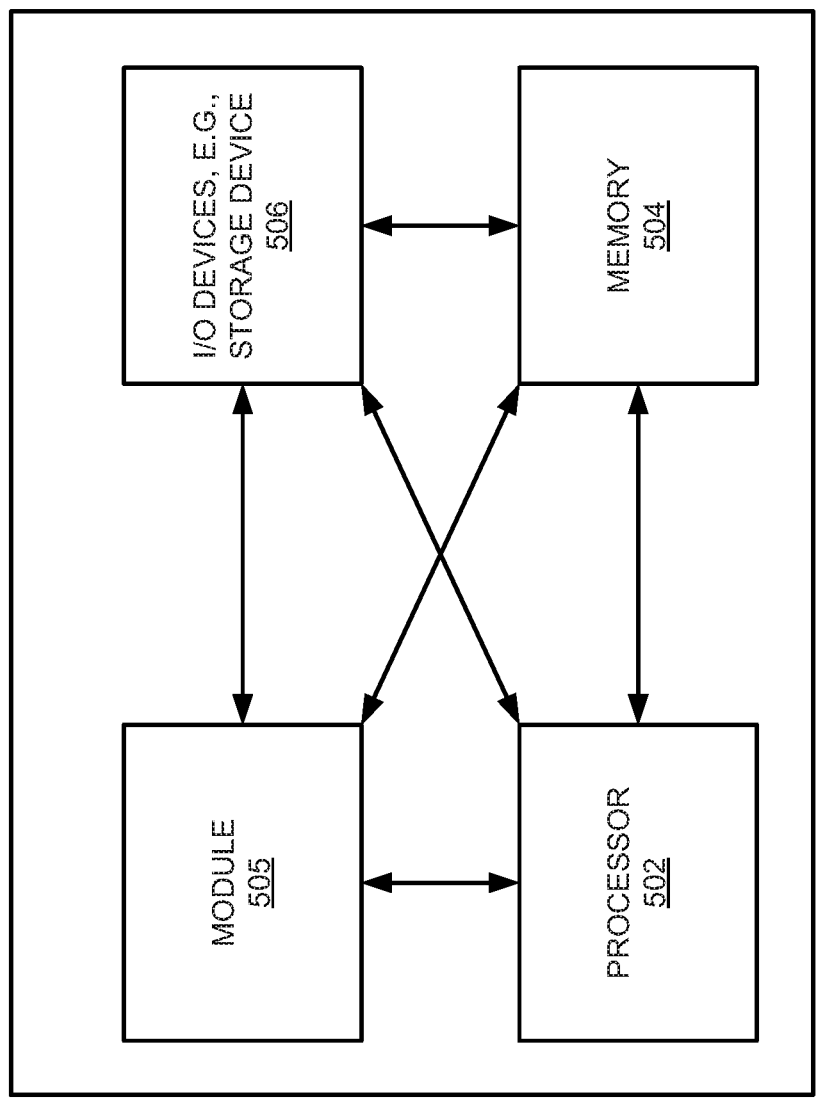

As further illustrated in FIG. 1, network 105 includes a software defined network (SDN) controller 155 and a path computation element (PCE) 150. In one example, the SDN controller 155 may comprise a computing system or server, such as computing system 500 depicted in FIG. 5, and may be configured to provide one or more operations or functions for selecting paths in ROADM networks using machine learning. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 5 and discussed below) or multiple computing devices collectively configured to perform various steps, functions, and/or operations in accordance with the present disclosure. In addition, with respect to ROADMs, "configured" and "reconfigured" may refer to instructions to adjust a WSS to route different wavelengths to different fibers/links and/or to different add/drop ports. With respect to network switches and transponders, "configured" and "reconfigured" may refer to instructions to send or receive at a particular bitrate, to utilize a particular transmit power, to transmit or receive on a particular wavelength, and the like.

In one example, nodes 131-137 and components 181-184 (and/or the devices therein) may be controlled and managed by SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. Thus, various components of network 105 may comprise virtual network functions (VNFs) which may physically comprise hardware executing computer-readable/computer-executable instructions, code, and/or programs to perform various functions. For example, the functions of SDN controller 155 may include the selection of a network function virtualization infrastructure (NFVI) from among various NFVIs available at nodes 131-137 in network 105 to host various devices, such as routers, gateways, switches, route reflectors, firewalls, media servers, and so forth. To illustrate, network switches 193 and 197 may physically reside on host devices that may be configured to be a firewall, a media server, a network switch, a router, and so forth.

In addition, SDN controller 155 may also manage the operations of optical components of the network 105. For instance, SDN controller 155 may configure paths for wavelength connections via the network 105 by configuring and reconfiguring ROADMs at nodes 131-137 and components 181-184. For example, SDN controller 155 may provide instructions to control wavelength selective switches (WSSs) within the ROADMs, as well as transceivers and/or transponders connected to the ROADM add/drop ports. In one example, SDN controller 155 may maintain communications with nodes 131-137 and components 181-184 (and/or the devices therein) via a number of control links 151 which may comprise secure tunnels for signaling communications over an underling IP infrastructure of network 105, e.g., including fibers/links 120-129, etc. In other words, the control links 151 may comprise virtual links multiplexed with transmission traffic and other data traversing network 105 and carried over a shared set of physical links. Alternatively, or in addition, the control links 151 may comprise out-of-band links, e.g., optical or non-optical connections that are different from fibers/links 120-129. In one example, SDN controller 155 may be in communication with node controllers at each node 131-137 (and in one example at components 181-184). For example, node controllers 178 and 179 may be responsible for instantiating and releasing instances of virtual machines at nodes 136 and 137 respectively, and for configuring and reconfiguring operations of associated ROADMs, such as ROADMs 191 and 195, transponders 192 and 196, transceiver 199, network switches 193 and 197, and so on. Thus, in one example, node controllers 178 and 179 may receive instructions for configuring and reconfiguring ROADMs 191 and 195 from SDN controller 155, e.g., via control links 151. Alternatively, or in addition, control links 151 may provide connections between SDN controller 155 and ROADMs 191 and 195, transponders 192 and 196, transceiver 199, and network switches 193 and 197 without the involvement of separate node controllers 178 and 179. In one example, the SDN controller 155 may also comprise a virtual machine operating on one or more NFVI/host devices, or may comprise one or more dedicated devices. For instance, SDN controller 155 may be collocated with one or more VNFs, may be deployed in one or more different host devices, or at a different physical location or locations, and so forth.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to provision optical network paths in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As further illustrated in FIG. 1, the network 105 also includes a path computation element (PCE) 150. In one example, PCE 150 may comprise a computing system or server, such as computing system 500 depicted in FIG. 5, and may be configured to provide one or more operations or functions in accordance with the present disclosure. PCE 150 may be collocated with one or more of nodes 131-137, components 181-184, or SDN controller 155, or may be deployed at one or more different physical locations. In one example, network 105 may comprise a distributed PCE environment with multiple PCEs responsible for different zones, e.g., segregated by geographic area, by functionality type, etc. Thus, for example, PCE 150 may be selected to manage path utilizations in the portion of network 105 relating to components 181-184 and nodes 131-137. For instance, the PCE 150 may be selected by the SDN controller 155.

As illustrated in FIG. 1, PCE 150 may be in communication with SDN controller 155 and may provide path computation decisions, such as reachability determinations, to the SDN controller 155. In turn, SDN controller 155 may provision wavelength connections via paths identified by PCE 150. For instance, SDN controller 155 may receive a request to establish a wavelength connection from component 181 to component 184, e.g., to carry traffic between user devices 141 and 142. SDN controller 155 may then forward the request to PCE 150 to calculate a path. For illustrative purposes, PCE 150 may consider a candidate path comprising links 120, 121, 122, 123, and 124, and may make a reachability determination as part of a path computation process. If the path comprising links 120, 121, 122, 123, and 124 is determined to be "reachable" and if the path satisfies other criteria, such as being a least cost path, or a path that supports a least cost route as computed at a higher layer (e.g., for IP or IP/MPLS routing), the PCE 150 may return the path to SDN controller 155 for deployment. SDN controller 155 may then communicate with the nodes 131, 132, 133, and 135, and components 181 and 184 to configure ROADMs to maintain a wavelength connection over the path. It should be noted that although nodes 131, 132, 133, and 135 may include network switches and/or routers operating in the non-optical domain, a wavelength connection via the path comprising links 120, 121, 122, 123, and 124 may be optically switched through ROADMs at nodes 131, 132, 133, and 135 (and bypassing any routers (e.g., layer 3 routers) or non-optical switches) that may be present at the respective nodes. In one example, components 181 and 184 may be configured to add and drop the wavelength of the wavelength connection and to perform optical-electrical conversion and vice versa, e.g., via a transponder coupled to an add/drop port of a ROADM therein.

In this regard, PCE 150 may store various data in connection with managing path utilizations for telecommunication network tunnels. For instance, PCE 150 may maintain a topology information block (TIB) that includes records for various links/fibers between the nodes 131-137 and components 181-184 in network 105, such as the available wavelengths, the wavelengths assigned/in-use and/or the available/free wavelengths, the paths assigned to respective wavelengths, the fiber lengths, capacities, and ages, the availability of transponders, switches, and/or other infrastructure at various nodes, transponder and/or transceiver performance capabilities of the various nodes, information regarding any protection scheme involving a fiber, and/or any particular wavelengths that may be utilized over the fiber, and so forth.

It should be noted that the system 100 has been simplified. In other words, the system 100 may be implemented in a different form than that illustrated in FIG. 1. For example, the system 100 may be expanded to include additional networks and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 155, PCE 150, and/or other network elements may comprise functions that are spread across several devices that operate collectively as a SDN controller, a PCE, etc. In another example, PCE 150 and SDN controller 155 may be integrated into a single device. In another example, PCE 150 may maintain its own connections to nodes 131-137 and components 181-184 and may send instructions to various devices to configure paths for wavelength connections in accordance with the present disclosure. In another example, nodes 131-137 and/or components 181-184 may include fiber loss test sets (FLTSs), optical time domain reflectometers (OTDRs), polarization mode dispersion (PMD) measurement devices, and the like which may be used to measure fiber loss and PMD over various links.

In addition, the foregoing includes examples where operations for selecting optical network paths in real-time using machine learning are performed by PCE 150, and/or by PCE 150 in conjunction with other devices under the control and instruction of SDN controller 155. However, in other, further, and different examples, aspects of selecting optical network paths in real-time using machine learning may include transponders and/or network switches performing one or more operations autonomously. Thus, these and other modifications of the system 100 are all contemplated within the scope of the present disclosure.

Figure 2:
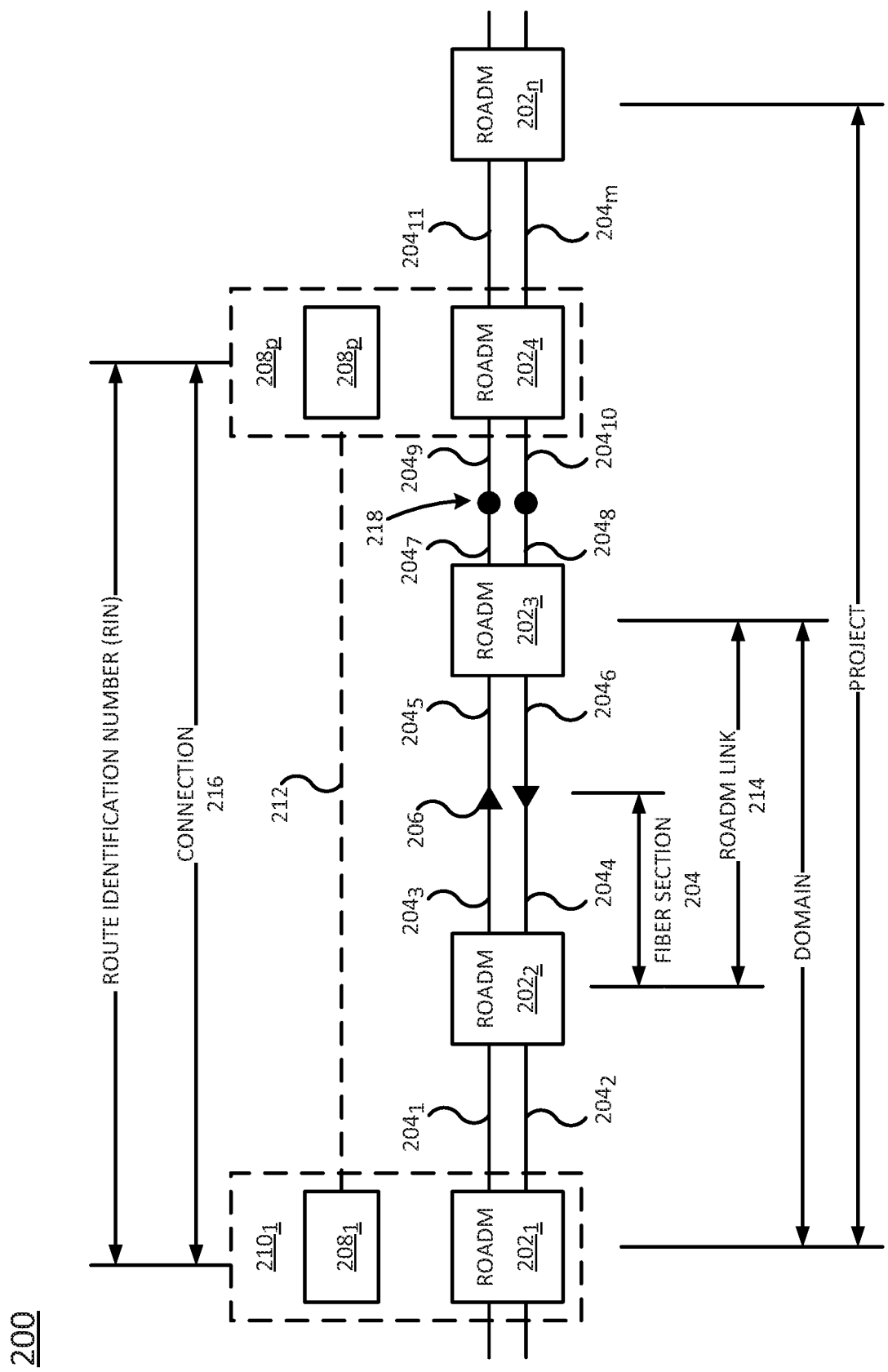
FIG. 2 illustrates various concepts related to the present disclosure.

FIG. 2 illustrates various concepts related to the present disclosure. In particular, FIG. 2 illustrates a portion of a ROADM network 200. The portion of the ROADM network 200 comprises a plurality of ROADMs 202_1-202_n (hereinafter individually referred to as a "ROADM 202" or collectively referred to as "ROADMs 202") connected by a plurality of optical fiber sections 2041-204m (hereinafter individually referred to as an "optical fiber section 204" or collectively referred to as "optical fiber sections 204"). The ROADM network 200 may additionally comprise at least one optical amplifier 206.

Moreover, at least one ROADM 202 may be coupled (e.g., via a plurality of add/drop ports) to a transponder $208_1$-$208_p$ (hereinafter individually referred to as a "transponder 208" or collectively referred to as "transponders 208"). A ROADM 202 and a transponder 208 may collectively form what may be referred to as an "office" $210_1$-$210_p$ (hereinafter individually referred to as an "office 210" or collectively referred to as "offices 210"). Each office 210 may be associated with a Common Language Location Identifier (CLLI) code. Moreover, any office 210 may include more than one ROADM 202 and may contain any or all of the equipment illustrated at nodes 136 and 137 of FIG. 1.

A connection or wavelength (an example of which is illustrated in FIG. 2 at 216) may be formed between a pair of transponders 208 (or a pair of offices 210). A connection may be associated with a route identification number (RIN). A connection between two ROADMs, including any intermediary ROADMs, amplifiers, and fiber sections, may form a domain.

A project may refer to a construction project, e.g., where the construction project may comprise the augmentation of an existing network. For example, a project might include the addition of new ROADM links, optical amplifiers, transponders, and/or ROADMs to an existing ROADM network. Thus, the sequence of ROADMs 202 in FIG. 2 might represent one project.

According to examples of the present disclosure, an optical wavelength 212 may traverse one or more ROADM links (an example of which is illustrated in FIG. 2 at 214), i.e., connections between pairs of ROADMs 202. Each ROADM link in turn may traverse one or more optical fiber sections 204. Different optical fiber sections 204 may use different fiber types (e.g., enhanced large effective area fiber (ELEAF), non-dispersion-shifted fiber (NDSF), TRUEWAVE CLASSIC (TWC) fiber, TRUEWAVE REDUCED SLOPE (TWRS) fiber, or the like); for instance, a change of fiber type is indicated in FIG. 2 at 218. A change in fiber type may occur even where there is no ROADM 202 or amplifier 206, as shown.

Figure 3:
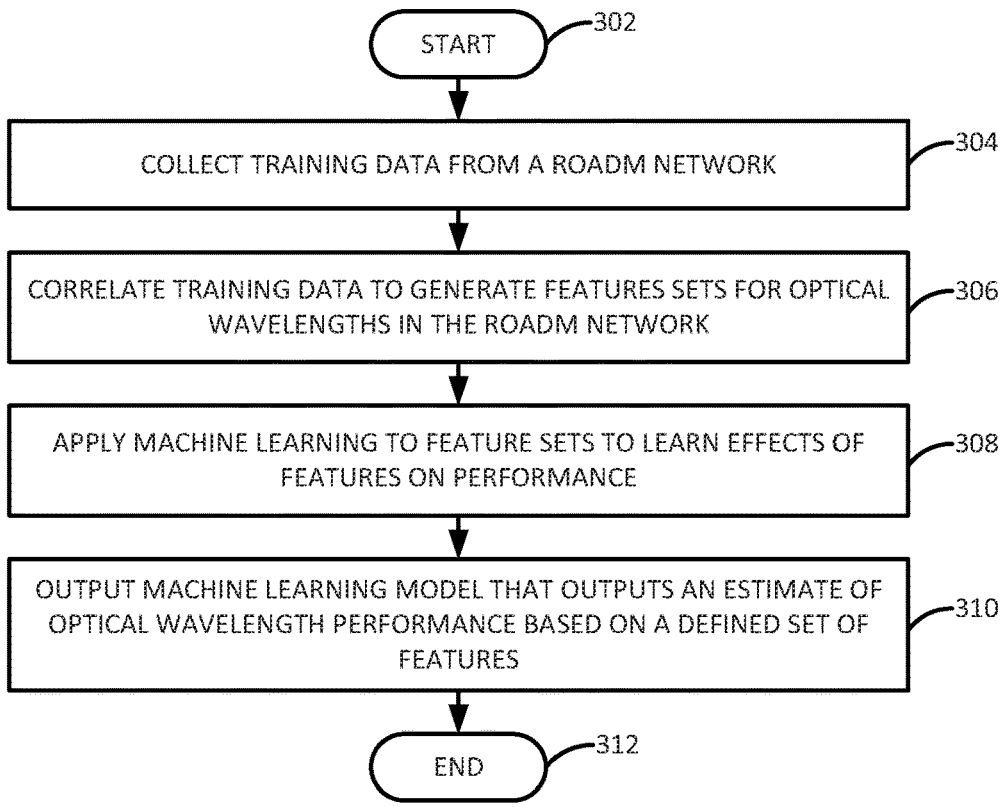
FIG. 3 illustrates a flowchart of an example method for training a machine learning model to predict the optical performance of a proposed wavelength in a ROADM network.

FIG. 3 illustrates a flowchart of an example method 300 for training a machine learning model to predict the optical performance of a proposed wavelength in a ROADM network. In one example, steps, functions and/or operations of the method 300 may be performed by a network-based device, such as PCE 150 in FIG. 1, or any one or more components thereof, such as a processing system. Alternatively, or in addition, the steps, functions and/or operations of the method 300 may be performed by a processing system collectively comprising a plurality of devices as illustrated in FIG. 1, such as PCE 150, SDN controller 155, ROADM 191 and/or ROADM 195, transponders 192 and 196, and/or transceiver 199, network switches 193 and/or 197, node controllers 178 and/or 179, and so forth. In one example, the steps, functions, or operations of method 300 may be performed by a computing device or system 500, and/or a processing system 502 as described in connection with FIG. 5 below. For instance, the computing device 500 may represent at least a portion of a PCE or an SDN controller, in accordance with the present disclosure. For illustrative purposes, the method 300 is described in greater detail below in connection with an example performed by a processing system, such as processing system 502, or a processing system comprising a plurality of devices. The method 300 begins in step 302 and proceeds to step 304.

At step 304, the processing system may collect training data from a ROADM network. The ROADM network may be a single-vendor network (e.g., including ROADMs supplied by a single vendor) or a multi-vendor network (e.g., including ROADMs supplied by at least two vendors, such as an Open ROADM network). The training data may comprise optical data collected over a fixed period of time (e.g., one day, two days, etc.) as well as network data which may be less susceptible to fluctuation over time. The network data can be used to interpret the optical data.

In one example, the optical data includes static fiber design data that does not change appreciably from one time period to another (e.g., fiber pairs, sources, destinations, types, lengths, losses, margins, polarization mode dispersions, flags), measured fiber loss data for specific time periods (e.g., port identifiers, node names, measured losses), ROADM and optical amplifier equipment details (e.g., node names, types, bays, domains, statuses), transponder wavelength design data (e.g., locations, projects, systems, bays, shelves, slots, types), and bit error rate (BER) measurements (e.g., locations, ports, types, and bit error rates before forward error correction (preFEC BER)).

In one example, the network data includes project data (e.g., project IDs, facility IDs, route IDs, sub-facilities), route data (e.g., route IDs, end points, distances), route/span mapping data (e.g., route IDs, span IDs, sequences), location data (e.g., CLLI codes, latitudes, longitudes), and transport deployment plans (TDPs) (e.g., lists of ROADM sections by project).

At step 306, the processing system may correlate the training data to generate feature sets for optical wavelengths in the ROADM network. Correlation of the training data may be complicated in some examples by the manner in which the training data is defined. For instance, the training data may be defined in terms of projects, domains, RINs, office CLLI codes, and/or the like.

In one example, correlation of the training data in step 306 includes at least one of: matching amplifiers and ROADMs in the ROADM network to optical fiber sections based on domain information; pairing transponder ports in the ROADM network based on project and time, distance, place (TDP) data to form connections (wavelengths); mapping ROADM links to span data; and mapping connections (wavelengths) to ROADM links based on RIN and span information. In one example, if a wavelength cannot be mapped (e.g., due to incomplete or ambiguous data), the wavelength is discarded from the training data.

In one example, correlation of training data in step 306 may discard (or at least aggregate) other types of training data. Because different wavelengths may traverse different numbers of ROADM links and optical fiber sections, it may not be possible to retain all of the training data and still maintain an equal number of features per wavelength. Thus, for example, instead of including the measured loss for every optical fiber section along every wavelength (which would result in a variable number of features), the loss data may instead be summarized by a group of a fixed number of features (e.g., total fiber loss, largest loss value, second largest loss value, and average loss per optical fiber section). However, it should be noted that some features (e.g., optical signal to noise ratio (OSNR)) could potentially be calculated based on a variable number of optical fiber sections.

In one example, the feature set produced for each wavelength in accordance with step 306 includes one or more of the following features: calculated OSNR (based on measured loss and optical fiber type); speed (e.g., 40 Gigabits per second or 100 Gigabits per second); slot number on dense wavelength division multiplexing unit (DWDMU) facility (which determines the wavelength's frequency); polarization mode dispersion (PMD); number of pass-through ROADMs; number of amplifiers in the path; length of path (e.g., in miles or other units); length (e.g., in kilometers or other units) of each optical fiber type (potentially with separate totals for fiber junctions); measured fiber loss (total, largest, second largest, and average per mile or other unit); optical return loss (ORL) (i.e., a measure of reflection as "good" or "bad"); margin, i.e., the difference between net power and minimum power (total, largest, and average per mile or other unit); and measurement date (e.g., month, year, etc.).

In a further example, the feature set may further include features related to interference from adjacent wavelengths. Each wavelength is assigned to a specific frequency (or "slot") on an optical fiber pair. Wavelengths assigned to adjacent slots may interfere with each other. Thus, if known, the statuses of the adjacent slots on either side of a wavelength (e.g., "in use" or "idle") may provide information about interference.

In step 308, the processing system may apply a machine learning algorithm to the optical wavelength feature sets produced in step 306 to learn, for each wavelength for which a feature set is available, the effect of the features on the wavelength's performance (e.g., pre-FEC BER in each direction). In one example, the BERs in the training data range from $10^{-14}$ to $10^{-2}$. In this case, the BER to be estimated by the machine learning algorithm is $\log_{10}(BER)$.

In one example, the machine learning algorithm is a penalized linear regression algorithm (e.g., ridge regression, least absolute shrinkage selection operator (LASSO), etc.). For instance, the machine learning algorithm may estimate a coefficient β in a model of the type:

$$\min \|y - \beta x\|_2^2 + \alpha \|\beta\|_p^p, \quad (EQN.\ 1)$$

with p=2 for ridge regression or p=1 for LASSO, where X denotes the set of features for the wavelengths and y denotes the measured output values ($\log_{10}(BER)$). The LASSO example encourages sparsity in β (as would be expected if most of the features have no impact on BER), while the ridge regression example reduces instability in estimating 13 when the features are highly correlated.

In another example, the machine learning algorithm is an ensemble of regression trees (e.g., gradient boosted regression trees, random forests, etc.). A regression tree is a piecewise linear regression that iteratively splits the data according to an error criterion and fits separate regressions to each portion of the split data. Both gradient boosted regression trees and random forests train several different regression trees over different subsets of the features, and take an average over all of the trees to obtain a final estimate.

In step 310, the processing system may output a machine learning model that is trained to output an estimated performance metric (e.g., pre-FEC BER as ($\log_{10}(BER)$) for an input wavelength, where the estimated BER is based on a defined set of features (e.g., the features discussed in connection with step 306) for the wavelength.

The method 300 may end in step 312.

It should be noted that the method 300 may be expanded to include additional steps or may be modified to include additional operations with respect to the steps outlined above. For instance, in one example, the method 300 may be repeated as additional training data becomes available. Thus, these and other modifications are all contemplated within the scope of the present disclosure.

A machine learning model trained according to the method 300 may therefore be based on all available and current information about existing and proposed wavelengths from a single vendor or a multi-vendor (e.g., Open ROADM) network, such as distance, bit rate, frequency, fiber types, number of pass-through ROADMs, measured fiber loss, polarization mode dispersion, and/or calculated optical signal to noise ratio. The machine learning model may aggregate and integrate data from a variable number of optical fiber sections into a fixed number of machine learning model features.

Moreover, the machine learning model does not need to have access to vendors' proprietary information about the ROADMs and can work with ROADMs from multiple vendors.

The machine learning model can predict, in real time, wavelength performance (e.g., pre-FEC BER) for proposed wavelengths based on performance data from existing wavelengths, which realistically reflects the current network conditions. The prediction can also be made with far less data than is used by conventional machine learning applications.

The above-described approach allows for flexible implementation of various machine learning techniques, including techniques in addition to those explicitly discussed (e.g., penalized linear regression, multilayer perceptron, random forest trees, and yet-to-be-developed techniques). A closed loop mechanism may allow the machine learning model parameters to be continuously updated, as described in further detail below in connection with FIG. 4, as new data becomes available and as the network evolves with new equipment and technologies.

Figure 4:
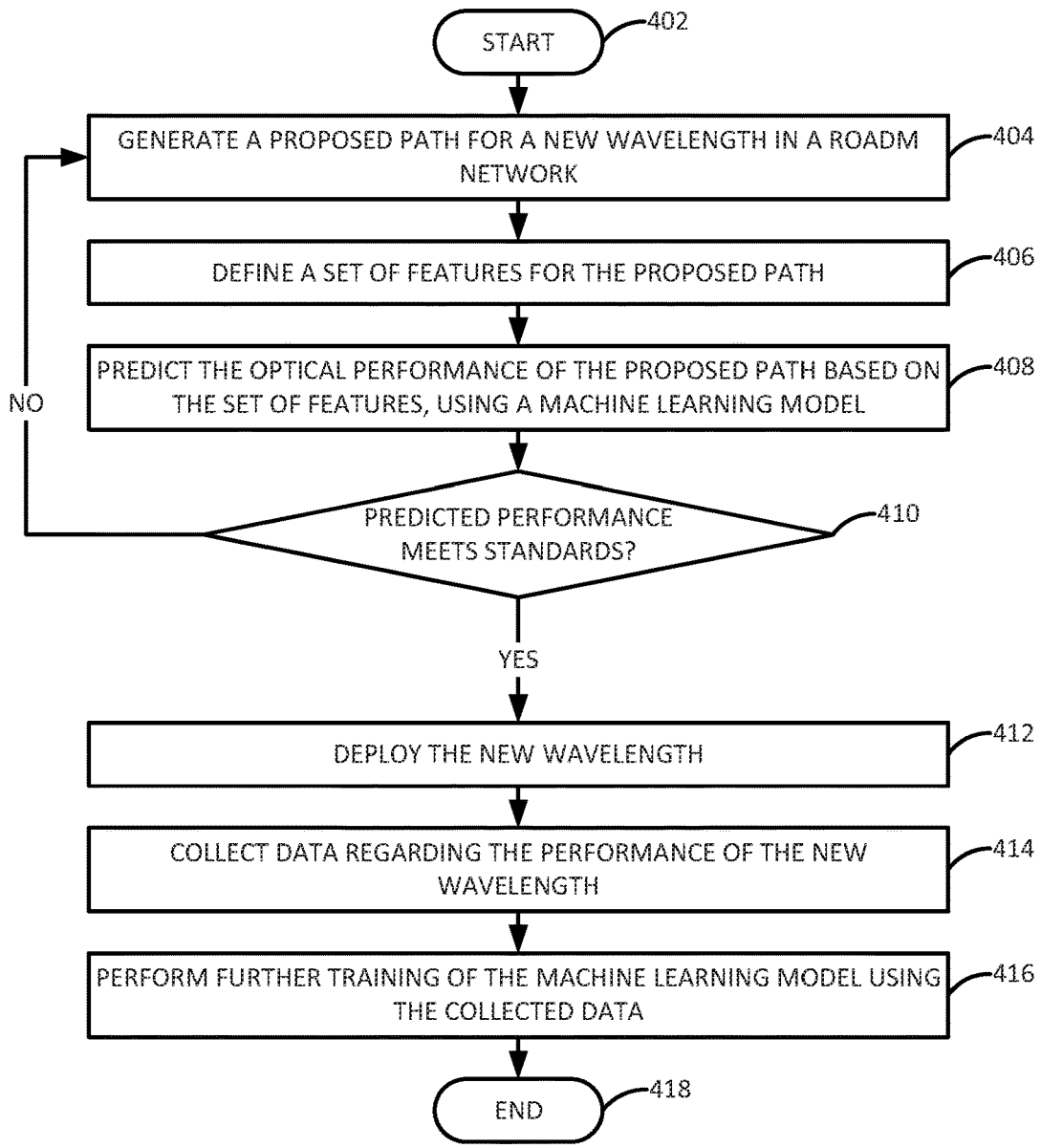
FIG. 4 illustrates a flowchart of an example method for selecting optical network paths in real-time using machine learning and FIG. 5 illustrates an example high-level block diagram of a computer specifically programmed to perform the steps, functions, blocks, and/or operations described herein.

FIG. 4 illustrates a flowchart of an example method 400 for selecting optical network paths in real-time using machine learning. In one example, steps, functions and/or operations of the method 400 may be performed by a network-based device, such as PCE 150 in FIG. 1, or any one or more components thereof, such as a processing system. Alternatively, or in addition, the steps, functions and/or operations of the method 400 may be performed by a processing system collectively comprising a plurality of devices as illustrated in FIG. 1, such as PCE 150, ROADM 191 and/or ROADM 195, transponders 192 and 196, and/or transceiver 199, network switches 193 and/or 197, node controllers 178 and/or 179, and so forth. In one example, the steps, functions, or operations of method 400 may be performed by a computing device or system 500, and/or a processing system 502 as described in connection with FIG. 5 below. For instance, the computing device 500 may represent at least a portion of a PCE or SDN controller, in accordance with the present disclosure. For illustrative purposes, the method 400 is described in greater detail below in connection with an example performed by a processing system, such as processing system 502, or a processing system comprising a plurality of devices. The method 400 begins in step 402 and proceeds to step 404.

At step 404, the processing system may generate a proposed path for a new wavelength in a ROADM network. In one example, the proposed path is generated in response to a request for the new wavelength. The proposed path may traverse one or more ROADM links in the ROADM network, as well as one or more optical fiber sections (which may be of different fiber types). The ROADM network may be a single-vendor network (e.g., including ROADMs supplied by a single vendor) or a multi-vendor network (e.g., including ROADMs supplied by at least two vendors, such as an Open ROADM network).

In step 406, the processing system may define a set of features for the proposed path. The set of features may include both optical data and network data. For instance, the set of path features may include one or more of: calculated OSNR (based on measured loss and optical fiber type); speed (e.g., 40 Gigabits per second or 100 Gigabits per second); slot number on dense wavelength division multiplexing unit (DWDMU) facility (which determines the wavelength's frequency); polarization mode dispersion (PMD); number of pass-through ROADMs; number of amplifiers in the path; length of path (e.g., in miles or other units); length (e.g., in kilometers or other units) of each optical fiber type (potentially with separate totals for fiber junctions); measured fiber loss (total, largest, second largest, and average per mile or other unit); optical return loss (ORL) (i.e., a measure of reflection as "good" or "bad"); margin, i.e., the difference between net power and minimum power (total, largest, and average per mile or other unit); and measurement date (e.g., month, year, etc.).

In step 408, the processing system may predict the optical performance of the proposed path based on the set of features, using a machine learning model. In one example, the machine learning model has been trained (e.g., in accordance with the method 300 described above) to predict optical performance based on a fixed set of path features. For instance, the machine learning model may be a penalized linear regression model or an ensemble of regression trees as discussed above. The predicted optical performance may be quantified as the proposed path's estimated BER (e.g., pre-FEC BER) or as another performance metric.

In step 410, the processing system may determine whether the predicted optical performance of the proposed path meets the service provider's optical performance standards (e.g., meets a target or threshold bit error rate (BER) or other performance metric).

If it is determined in step 410 that the predicted optical performance of the proposed path meets the service provider's optical performance standards, then the method 400 may proceed to step 412. In step 412, the processing system may deploy the requested wavelength (e.g., by assigning the requested wavelength to a specific frequency or "slot" on the optical fiber pairs in the ROADM network).

Once the requested wavelength has been deployed, the method 400 may proceed to step 414. In step 414, the processing system may collect data regarding the performance of the new wavelength. The data may include information about any of the features discussed in connection with step 406.

In step 416, the processing system may perform further training of the machine learning model using the collected data regarding the performance of the new wavelength. The further training may be performed in accordance with the method 300 described in connection with FIG. 3. This will help to refine the machine learning model and improve the accuracy of the optical performance predictions that are made for future proposed paths. It should be noted that the machine learning model may not be retrained immediately following deployment of every new wavelength. For instance, further training of the machine learning model in accordance with step 416 could be performed periodically (e.g., according to some repeating, defined schedule), after collection of some threshold amount of new data or deployment of a threshold number of new wavelengths, randomly, on-demand, or according to any other schedule.

The method 400 may end in step 418 after performing the further training of the machine learning model.

Referring back to step 410, if it instead is determined that the predicted optical performance of the proposed path does not meet the service provider's optical performance standards, then the method 400 may return to step 404 and generate a new proposed path. The method 400 may then proceed as described above to evaluate the optical performance of the new proposed path. New proposed paths may be generated as many times as necessary until a proposed path is found that meets the service provider's optical performance standards.

It should be noted that in addition to estimating the optical performance of proposed paths for new wavelengths, the machine learning model could also be used to evaluate the performance of existing wavelengths and to move the existing wavelengths to better performing alternative paths (e.g., as conditions in the ROADM network evolve).

Although not specifically specified, one or more steps, functions or operations of the method 300 or the method 400 may include a storing, displaying, and/or outputting step as required for a particular application. In other words, any data, records, fields, and/or intermediate results discussed in the example method 300 or method 400 can be stored, displayed, and/or outputted to another device as required for a particular application. Furthermore, steps or blocks in FIG. 3 or 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 or method 400 may comprise optional steps, or can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for selecting paths in ROADM networks using machine learning, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, transceivers, power units, and so forth. Although only one processor element is shown, it should be noted that the computing device may employ a plurality of processor elements. Furthermore, although only one computing device is shown in the figure, if the method 300 or method 400 as discussed above is implemented in a distributed or parallel manner for a particular illustrative example, i.e., the steps of the above method 300 or method 400, or the entire method 300 or method 400 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the methods discussed above can be used to configure a hardware processor to perform the steps, functions and/or operations of the above disclosed method 300 and/or method 400. In one example, instructions and data for the present module or process 505 for selecting paths in ROADM networks using machine learning (e.g., a software program comprising computer-executable instructions) can be loaded into memory 504 and executed by hardware processor element 502 to implement the steps, functions, or operations as discussed above in connection with the illustrative method 300 and/or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for selecting paths in ROADM networks using machine learning (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

defining, by a processing system including at least one processor, a feature set for a proposed path through a wavelength division multiplexing network, wherein the proposed path traverses at least one link in the wavelength division multiplexing network, and wherein the at least one link connects a pair of reconfigurable optical add/drop multiplexers, wherein the wavelength division multiplexing network includes a plurality of reconfigurable optical add/drop multiplexers including the pair of reconfigurable optical add/drop multiplexers, and wherein the plurality of reconfigurable optical add/drop multiplexers comprising at least one reconfigurable optical add/drop multiplexer manufactured from a first vendor and at least one reconfigurable optical add/drop multiplexer manufactured from a second vendor different from the first vendor;

predicting, by the processing system, an optical performance of the proposed path, wherein the predicting employs a machine learning model that takes the feature set as an input and outputs a metric that quantifies a predicted optical performance of the proposed path; and determining, by the processing system, whether to deploy a new wavelength on the proposed path based on the predicted optical performance of the proposed path.

2. The method of claim 1, wherein the feature set includes measured fiber losses of the proposed path and margins of the proposed path.

3. The method of claim 2, wherein the measured fiber losses include at least one of: a total fiber loss, a largest fiber loss, a second largest fiber loss, and an average fiber loss per mile.

4. The method of claim 3, wherein the margins include at least one of: a total margin, a largest margin, and an average margin per mile.

5. The method of claim 4, wherein the feature set further includes at least one of: a calculated optical signal to noise ratio of the proposed path, a speed of the proposed path, a slot number of the proposed path on a dense wavelength division multiplexing unit facility, a polarization mode dispersion of the proposed path, a number of passthrough reconfigurable optical add/drop multiplexers on the proposed path, a number of amplifiers on the proposed path, a length of the proposed path, a length of each optical fiber type in the proposed path, and an optical return loss of the proposed path.

6. The method of claim 5, wherein the feature set further includes a date on which features in the feature set were measured.

7. The method of claim 1, wherein the machine learning model is a penalized linear regression model.

8. The method of claim 1, wherein the machine learning model is an ensemble of regression trees.

9. The method of claim 8, wherein the machine learning model is a random forest model.

10. The method of claim 1, wherein the metric is a bit error rate of the proposed path.

11. The method of claim 10, wherein the bit error rate is a bit error rate before forward error correction.

12. The method of claim 11, wherein the bit error rate is a $\log_{10}$(bit error rate).

13. The method of claim 1, wherein the determining comprises:

determining the metric satisfies an optical performance standard; and deploying the new wavelength on the proposed path.

14. The method of claim 13, wherein the optical performance standard is a threshold value for the metric.

15. The method of claim 13, further comprising:
collecting data regarding an optical performance of the proposed path, after the deploying; and
training the machine learning model using the data.

16. The method of claim 1, wherein the determining comprises:
generating a new proposed path, when the metric fails to satisfy an optical performance standard;
defining a new feature set for the new proposed path, wherein the new proposed path traverses at least one link in the wavelength division multiplexing network, and wherein the at least one link of the new proposed path connects a pair of reconfigurable optical add/drop multiplexers;
predicting an optical performance of the new proposed path using the machine learning model, wherein the machine learning model that takes the new feature set as an input and outputs a new metric that quantifies a predicted optical performance of the new proposed path; and
determining whether to deploy the new wavelength on the new proposed path based on the predicted optical performance of the new proposed path.

17. The method of claim 1, further comprising:
defining a feature set for an existing path, wherein the existing path traverses at least one link in the wavelength division multiplexing network, and wherein the at least one link of the existing path connects a pair of reconfigurable optical add/drop multiplexers;
predicting an optical performance of the existing path, wherein the predicting employs the machine learning model, wherein the machine learning model takes the feature set for the existing path as an input and outputs a metric that quantifies a predicted optical performance of the existing path; and
determining whether to move an existing wavelength from the existing path to an alternative path based on the predicted optical performance of the existing path.

18. A non-transitory computer-readable medium storing instructions which, when executed by a processing system including at least one processor, cause the processing system to perform operations, the operations comprising:
defining a feature set for a proposed path through a wavelength division multiplexing network, wherein the proposed path traverses at least one link in the wavelength division multiplexing network, and wherein the at least one link connects a pair of reconfigurable optical add/drop multiplexers, wherein the network includes a plurality of reconfigurable optical add/drop multiplexers including the pair of reconfigurable optical add/drop multiplexers, and wherein the plurality of reconfigurable optical add/drop multiplexers comprising at least one reconfigurable optical add/drop multiplexer manufactured from a first vendor and at least one reconfigurable optical add/drop multiplexer manufactured from a second vendor different from the first vendor;
predicting an optical performance of the proposed path, wherein the predicting employs a machine learning model that takes the feature set as an input and outputs a metric that quantifies a predicted optical performance of the proposed path; and
determining whether to deploy a new wavelength on the proposed path based on the predicted optical performance of the proposed path.

19. A system, comprising:
a processor; and
a non-transitory computer-readable medium storing instructions which, when executed by the processor, cause the processor to perform operations, the operations comprising:
defining a feature set for a proposed path through a wavelength division multiplexing network, wherein the proposed path traverses at least one link in the wavelength division multiplexing network, and wherein the at least one link connects a pair of reconfigurable optical add/drop multiplexers, wherein the network includes a plurality of reconfigurable optical add/drop multiplexers including the pair of reconfigurable optical add/drop multiplexers, and wherein the plurality of reconfigurable optical add/drop multiplexers comprising at least one reconfigurable optical add/drop multiplexer manufactured from a first vendor and at least one reconfigurable optical add/drop multiplexer manufactured from a second vendor different from the first vendor;
predicting an optical performance of the proposed path, wherein the predicting employs a machine learning model that takes the feature set as an input and outputs a metric that quantifies a predicted optical performance of the proposed path; and
determining whether to deploy a new wavelength on the proposed path based on the predicted optical performance of the proposed path.

20. The non-transitory computer-readable medium of claim 18, wherein the determining comprises:
determining the metric satisfies an optical performance standard; and
deploying the new wavelength on the proposed path.

* * * * *